UNITED STATES PATENT OFFICE.

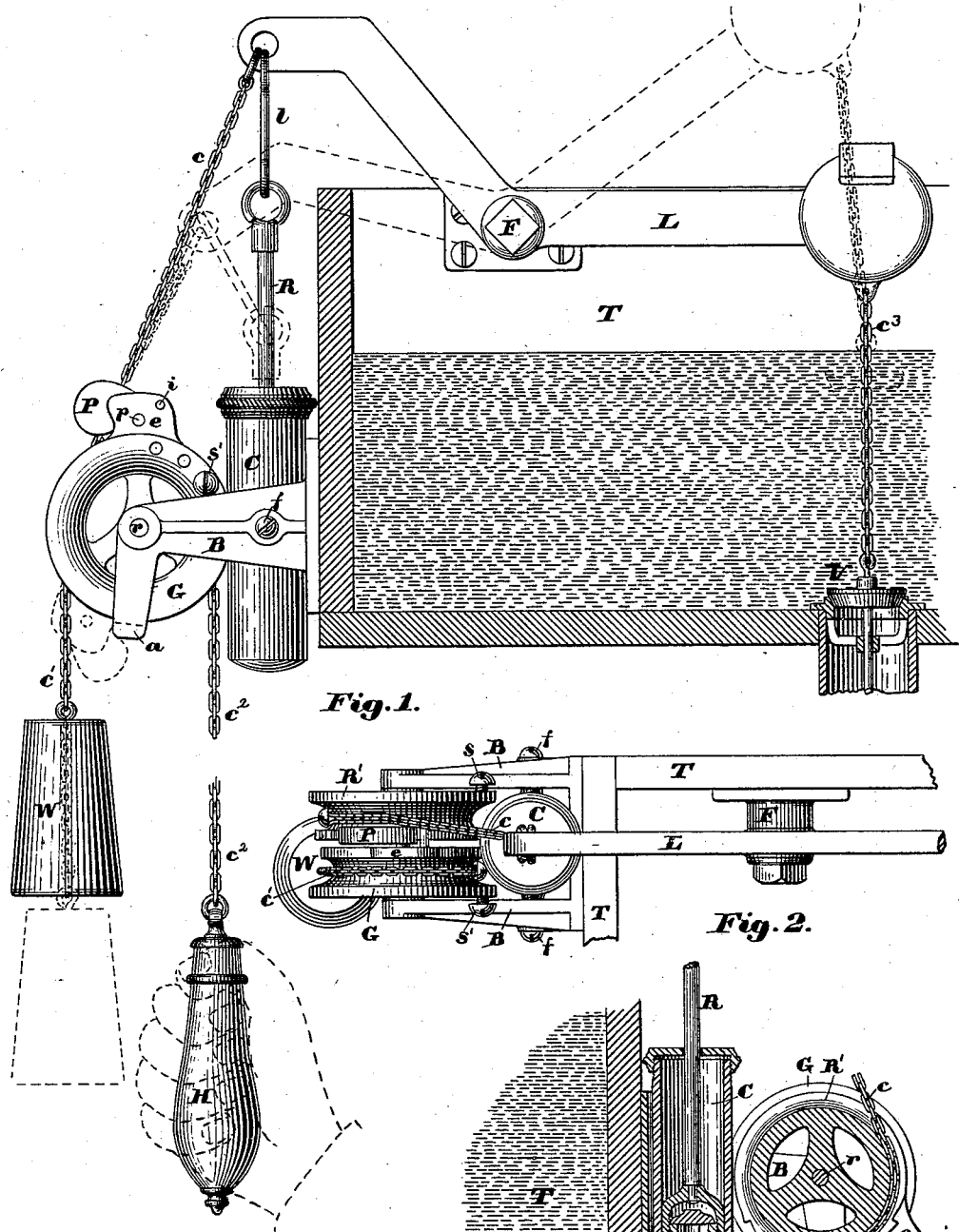

GEORGE T. WILSON, OF BOSTON, ASSIGNOR OF ONE-HALF TO JULIAN D'ESTÉ, OF SALEM, MASSACHUSETTS.

VALVE-OPERATING MECHANISM.

SPECIFICATION forming part of Letters Patent No. 364,695, dated June 14, 1887.

Application filed January 31, 1887. Serial No. 225,976. (No model.)

*To all whom it may concern:*

Be it known that I, GEORGE T. WILSON, of Boston, in the county of Suffolk and State of Massachusetts, have invented a new and useful Improvement in Valve-Operating Mechanisms, of which the following is a specification.

My invention relates to valve mechanism for so controlling the passage of water to a water-closet or other fixture required to be flushed as to prevent a greater amount of water passing to the water-closet or other fixture than is necessary to flush the same.

In my invention I employ a lever connected at one end with the valve and at the other end with a ratchet-wheel, and a wheel provided with means to operate it and carrying a weight and pawl, said pawl engaging with the ratchet-wheel when the pawl-carrying wheel is operated, and causing the ratchet-wheel to rotate when the pawl-carrying wheel is rotated by said weight, whereby the end of the lever connected with the ratchet-wheel is depressed, lifting thereby the end of the lever with which the valve is connected and causing the valve to rise, the pawl, when the valve is thus raised, being thrown out of gear with the ratchet-wheel, and the lever allowed to return to place and the valve to close. As a means to make the lever return to place slowly, and thus make the valve slow-closing, a piston, connected with the end of the lever with which the ratchet-wheel is connected, may be used to act as a drag upon the lever when returning to place; but this means of making the valve slow-closing forms no part of my present invention.

In the drawings, Figure 1 shows my invention in elevation, the tank and outlet-pipe in section, the handle H pulled down, the pawl engaged with the ratchet-wheel, and the valve closed. The parts shown in broken lines indicate the position of those parts at the instant when the pawl is thrown out of gear with the ratchet-wheel after the handle has been released and the weight has returned the pawl-carrying wheel to place and the pawl has caused the ratchet-wheel to rotate and depress the end of the lever with which the ratchet-wheel is connected and to open thereby the valve. Fig. 2 shows a top plan of my invention. Fig. 3 shows a section of a part of the valve-operating mechanism looking toward the side opposite to that shown in Fig. 1.

L is the lever attached to the tank T at F—the fulcrum of the lever. The lever is connected at its weighted end by the chain $c^3$ with the valve V, and connected at its other end by the chain $c$ with the grooved ratchet-wheel R', which latter wheel has the stop-screw $s$.

G is the pawl-carrying wheel, grooved and having an ear, $e$, to which is pivoted the pawl P at $p$. The ear $e$ has the pin $i$, to prevent the pawl from upsetting and failing to engage with the ratchet-wheel. The pawl-carrying wheel G has the screw-stop $s'$, and a weight, W, hung from it by the chain $c'$, and is connected with the operating-handle H by the chain $c^2$.

B is a bracket fastened to the tank T, supporting the cylinder C, by means of the screws $ff$, which pass loosely through holes in the bracket, that the cylinder may tilt when the lever moves. The bracket B further supports the ratchet-wheel R' and the pawl-carrying wheel G by means of the axis $r$, as shown, and is provided with an arm, $a$, which passes under the pawl-carrying wheel G, serving to stop the pawl-carrying wheel, and to throw the pawl out of gear with the ratchet-wheel when the pawl-carrying wheel is rotated by the weight W.

C is a cylinder having a hole, $h$, for the passage of air, in which works a piston, P', provided with a valve, $u$, for the passage of air, and connected by the piston-rod R and link $l$ with the end of the lever with which the ratchet-wheel is connected to act as a drag upon the lever when closing.

The operation is as follows: The handle H is drawn down and the pawl-carrying wheel rotated thereby, and the weight W lifted to the positions shown in Fig. 1. When the handle is released, the weight W causes the pawl-carrying wheel to rotate back to place, and its pawl P, engaged with the ratchet-wheel, to carry the ratchet-wheel to the position shown in Fig. 3, depressing thereby the end of the lever with which the ratchet-wheel is connected and lifting the end of the lever with which the valve is connected, causing the valve to rise and allow the water to flow to the water-closet or other fixture to be flushed. The pawl-carrying wheel, still rotating back to place, strikes the arm *a*, and is stopped thereby, and the pawl P, also striking the arm *a*, is thrown out of gear with the ratchet-wheel. The lever, pawl, and weight are then in the positions shown in broken lines in Fig. 1 and the valve wide open. The weighted end of the lever and the force exerted by the valve then causes the lever to return to place and to return the ratchet-wheel to place and allow the valve to close.

I claim—

A valve-operating mechanism having a lever connected at one end with the valve and at the other end with a ratchet-wheel, and having another wheel provided with means to operate it and carrying a weight and pawl, said pawl engaging with said ratchet-wheel to cause the valve to open, and being thrown out of gear with it to allow the valve to close, whereby the valve is opened but once and a single flushing caused, all substantially as described, for the purpose specified.

GEORGE T. WILSON.

Witnesses:
FRANK F. A. SCHILLER,
WALDRON BATES.